UNITED STATES PATENT OFFICE.

HARRY F. LEWIS, OF BUFFALO, NEW YORK, ASSIGNOR TO NATIONAL ANILINE & CHEMICAL CO., INC., OF NEW YORK, N. Y., A CORPORATION OF NEW YORK.

PURIFICATION OF ANTHRAQUINONE.

1,420,198. Specification of Letters Patent. Patented June 20, 1922.

No Drawing. Application filed March 29, 1920. Serial No. 369,641.

*To all whom it may concern:*

Be it known that I, HARRY F. LEWIS, a citizen of the United States, residing at Buffalo, in the county of Erie, State of New York, have invented certain new and useful Improvements in the Purification of Anthraquinone; and I do hereby declare the following to be a full, clear, and exact description of the invention, such as will enable others skilled in the art to which it appertains to make and use the same.

This invention relates to the purification of impure anthraquinone, and more particularly to the purification of anthraquinone from other oxidation products, and from certain hydrocarbons, such as phenanthrene, etc., in a simple and advantageous manner.

In the production of anthraquinone by oxidizing anthracene, for example, with a solution of chromic acid, or with an acid solution of sodium or potassium dichromate, such impurities as are admixed with the anthracene are subjected to the same oxidizing agent or agents as is the anthracene itself. As a result, the anthraquinone produced, after dissolving out the constituents which are soluble in water or in the acid solution, contains various impurities in admixture therewith. The nature and amount of the impurities will vary somewhat with the method of production and also with the purity of the anthracene used as the starting material for the oxidation. Thus, where the anthracene contains other hydrocarbons or nitrogenous bases admixed therewith, such as phenanthrene, fluorene, picene, acenaphthene, methylanthracene, pyrene, chrysene, retene, carbazol, etc., the anthraquinone produced will contain any unchanged anthracene or other hydrocarbons, or nitrogenous bases, and any oxidation products thereof, such as varying amounts of part or all of the following materials, namely, diphenic acid, carbazol and its oxidation products, other nitrogenous substances and their oxidation products, etc. The purification of the impure anthraquinone accordingly involves separating the anthraquinone from such impurities.

The present invention is based upon the discovery that impure anthraquinone, containing impurities of the character above referred to, can be purified and materially improved by subjecting the impure anthraquinone to extraction with such organic solvents as chlorbenzol, or like solvent. I have found that such solvents have a preferential or selective solvent action for the impurities or certain of them but have only a slight solvent action upon the anthraquinone itself.

The solvent which I have found to be particularly advantageous in the process of the present invention, is monochlorbenzol, but other halogenated hydrocarbon solvents can be similarly used, such as certain halogen derivatives of the simple aromatic hydrocarbons and of aliphatic hydrocarbons, for example, poly-halogenated benzol, chlor-toluol, di-, tri-, and tetra-chlor ethylene, tetra-, and penta-chlor ethane, etc., or mixtures of two or more of such solvents.

I have found that the difference in solubility of anthraquinone itself, and of certain of its common impurities, is such that these impurities can be very largely removed by extraction with solvents of the character above mentioned, while the anthraquinone itself, which is but slightly soluble, will be left behind in a purified or partially purified state. Thus oxidation products of carbazol, etc., are easily soluble in chlorbenzol. Certain of the hydrocarbon impurities commonly present, such as phenanthrene, are likewise easily soluble in chlorbenzol. Other hydrocarbons, particularly anthracene, have a limited solubility and are not readily removed in this way. The impurities more particularly removed in the purification process of the present invention are the oxidation products of carbazol and other nitrogen bases, as well as such unchanged hydrocarbons as phenanthrene, etc., and their oxidation products, such as phenanthraquinone, acenaphthaquinone, etc., and also such oxidation products as contain chromium as a constituent.

In the practice of the invention, the crude anthraquinone is extracted with the solvent in sufficient amounts to extract a considerable portion or substantially all of the soluble impurities, usually about five to ten times the weight of the anthraquinone, the resulting solution is then preferably cooled, if it has previously been heated, and is then filtered from the anthraquinone and from such impurities as are not soluble or dissolved in the solvent. The extraction is best effected at a temperature of about 20 to 60° C., and the solution is preferably cooled to as low a temperature as practicable before filtering, preferably to a temperature of around 10 to 25° C., before the solution of soluble impurities is filtered from the anthraquinone. The purified anthraquinone is then washed with the same solvent or mixture of solvents in amount sufficient to remove the mother liquor from the purified product, and the last traces of the solvent are removed from the purified anthraquinone by any suitable method, for example, by steam distillation. The impurities contained in solution in the solvent can be recovered by distillation of the solvent and they may in turn be utilized in the production of valuable intermediates or dyestuffs.

The extraction with the chlorbenzol or other solvent can be repeated one or more times, as where an especially impure anthraquinone is to be purified, until such soluble impurities as have escaped extraction by the first treatment have been subsequently removed.

The process of the present invention can be carried out in different forms of apparatus.

In practice the crude anthraquinone can be charged into a kettle, together with the solvent, and the temperature raised for example by means of a steam coil until the desired temperature is reached; for example, to a temperature of around 60° C. This temperature is maintained and the suspension is agitated over a suitable period of time, for example, about 30 minutes, or until the desired extraction has taken place. The solution is then cooled by means of suitable cooling means such as cooling pipes to the desired temperature, and is then filtered in a closed system, for example, by passing the solution through a suitable filter press. The filtrate may advantageously be collected in a kettle which is suitable for use as a still for the distillation of the solvent and the recovery thereof and of the dissolved impurities.

The invention will be further illustrated by the following specific example, the parts being by weight:

100 parts of crude anthraquinone are heated with 1000 parts of chlorbenzol at a temperature of about 20° C. for about 30 minutes, and the resulting solution is then filtered from the undissolved anthraquinone and insoluble impurities. The chlorbenzol solution obtained contains soluble impurities and may have a deep red color, while the anthraquinone remaining is lightened in color and materially improved in purity. The anthraquinone and insoluble impurities are washed on the filter with a further amount of the solvent and the wash liquor or solvent can be returned to the solution tank for use in the extraction of further amounts of impurities from the next charge in the further carrying out of the process. The filtering operation, as above noted, is advantageously carried out in a closed system, so that the solution can be passed from the kettle to the filter press without loss of the solvent by evaporation. The filter cake produced can be freed from its residual solvent by steam distillation.

Instead of operating in ordinary temperature, as in the above example, the same mixture of anthraquinone and solvent can be heated to a temperature of about 60° C. for a period of about thirty minutes, the suspension then cooled to about 15° C., and filtered. Material increase in purity of the anthraquinone has thus been effected. For example, an anthraquinone of 90 per cent purity has been increased by treatment according to the process of the present invention to a product of 95 per cent purity or higher. Anthraquinone having a larger amount of impurities has been similarly improved.

Where a part only of the impurities have been extracted in the first operation, the extraction can be repeated, as above stated, with further amounts of the same or a different solvent, to give a product of increased purity. So also, the operation can be carried out on the countercurrent principle, for example, by subjecting separate batches of the impure anthraquinone to successive extraction in such a way that the partially extracted material is subjected to the action of the fresh solvent, and the resulting solution, only partly saturated with impurities, is used in extracting fresh amounts of the impure anthraquinone.

The process of the present invention is applicable not only to the crude anthraquinone produced by the oxidation of anthracene by a chromic acid mixture, but also to the purification of commercial anthraquinone produced by other processes, or purified by other methods of purification, where it is still admixed with impurities of the character above referred to. Furthermore, the anthraquinone purified according to the process of the present invention can itself be subjected to further purification for the removal therefrom of such impurities as are insoluble in the solvent employed, and therefore, remain with the partially purified anthraquinone.

The process of the present invention provides a cheap and rapid method for the purification of crude anthraquinone or of partially purified anthraquinone which materially increases the purity of the product.

I claim:

1. The method of purifying impure anthraquinone, which comprises subjecting the same to treatment with a halogenated hydrocarbon solvent, and separating the resulting solution of impurities from the purified anthraquinone.

2. The method of removing products of oxidation of nitrogenous bases from impure anthraquinone, which comprises subjecting the impure anthraquinone to treatment with a halogenated hydrocarbon solvent and thereby dissolving such products of oxidation, and separating the resulting solution of such oxidation products from the purified anthraquinone.

3. The method of removing oxidation products containing chromium from impure anthraquinone, which comprises subjecting the same to treatment with a halogenated hydrocarbon solvent and thereby dissolving such chromium-containing oxidation products, and separating the resulting solution containing such oxidation products from the purified anthraquinone.

4. The method of purifying impure anthraquinone, which comprises subjecting the same to treatment with a chlor derivative of benzol, and separating the resulting solution of impurities from the purified anthraquinone.

5. The method of removing products of oxidation of nitrogenous bases from impure anthraquinone, which comprises subjecting the impure anthraquinone to treatment with chlorbenzol and thereby dissolving such products of oxidation, and separating the resulting solution of such oxidation products from the purified anthraquinone.

6. The method of removing oxidation products containing chromium from impure anthraquinone, which comprises subjecting the same to treatment with a chlor derivative of benzol and thereby dissolving such chromium-containing oxidation products, and separating the resulting solution containing such oxidation products from the purified anthraquinone.

7. The method of purifying impure anthraquinone, which comprises subjecting the same to treatment with a halogenated hydrocarbon solvent, separating the resulting solution of impurities from the purified anthraquinone, recovering the extracted impurities from the solvent, and returning the solvent for further use in the extraction of further amounts of the impure anthraquinone.

8. The method of purifying impure anthraquinone, which comprises subjecting the same to treatment with a halogenated hydrocarbon solvent, filtering the purified anthraquinone from the resulting solution, washing the purified anthraquinone thus obtained with fresh amounts of solvent, and extracting further amounts of impure anthraquinone with the resulting solvent.

9. The method of purifying impure anthraquinone, which comprises subjecting the same to treatment with a halogenated hydrocarbon solvent, separating the resulting solution from the purified anthraquinone, and repeating the extraction with further amounts of solvent to effect the extraction of further amounts of impurities therefrom.

In testimony whereof I affix my signature.

HARRY F. LEWIS.